(12) United States Patent
Kwak et al.

(10) Patent No.: US 8,044,936 B2
(45) Date of Patent: Oct. 25, 2011

(54) OPTICAL NAVIGATION DEVICE AND METHOD OF OPERATING THE SAME

(75) Inventors: Jong-Taek Kwak, Seongnam-si (KR);
Bang-Won Lee, Yongin-si (KR);
Young-Ho Shin, Yongin-si (KR);
Woo-Seok Lee, Yongin-si (KR)

(73) Assignee: Atlab Inc. (KR)

( * ) Notice: Subject to any disclaimer, the term of this patent is extended or adjusted under 35 U.S.C. 154(b) by 784 days.

(21) Appl. No.: 11/520,402

(22) Filed: Sep. 13, 2006

(65) Prior Publication Data
US 2007/0132734 A1 Jun. 14, 2007

(30) Foreign Application Priority Data

Dec. 9, 2005 (KR) .................... 10-2005-0120762

(51) Int. Cl.
*G09G 5/08* (2006.01)
(52) U.S. Cl. ........................................ 345/166
(58) Field of Classification Search .......... 345/156–158, 345/163, 165–166
See application file for complete search history.

(56) References Cited

U.S. PATENT DOCUMENTS

| | | | | |
|---|---|---|---|---|
| 6,144,366 | A | * | 11/2000 | Numazaki et al. ............ 345/156 |
| 6,816,150 | B2 | * | 11/2004 | Casebolt et al. ............. 345/166 |
| 2005/0264534 | A1 | * | 12/2005 | Lee ............................. 345/166 |

FOREIGN PATENT DOCUMENTS

CN 1704884 A 12/2005

OTHER PUBLICATIONS

Taiwan Office Action issued on Jan. 26, 2010 in the corresponding Taiwan Patent Application No. 95133865.

* cited by examiner

*Primary Examiner* — Amr Awad
*Assistant Examiner* — Kenneth Bukowski
(74) *Attorney, Agent, or Firm* — Cantor Colburn LLP

(57) ABSTRACT

Provided is an optical navigation device and a method of operating the same. The optical navigation device includes: a light source for irradiating light; an image sensor for collecting incident light to obtain an image; and a controller for performing a calculation mode that obtains an image when the light source is ON to calculate a movement value and determines whether the optical navigation device is moved on the basis of the movement value, a sleeping mode that turns OFF the light source and stops an operation of the image sensor, and a detection mode that obtains the image when the light source is ON and an image when the light source is OFF and then compares characteristics of the images to determine whether the optical navigation device is separated from the work surface, wherein the controller performs the calculation mode when the optical navigation device is moved and not separated from the work surface, performs the sleeping mode when not moved and separated from the work surface, and periodically performs the detection mode. Therefore, it is possible to precisely detect whether the optical navigation device is spaced apart from a work surface to prevent malfunction and unnecessary power consumption of the optical navigation device due to separation from the work surface.

9 Claims, 12 Drawing Sheets

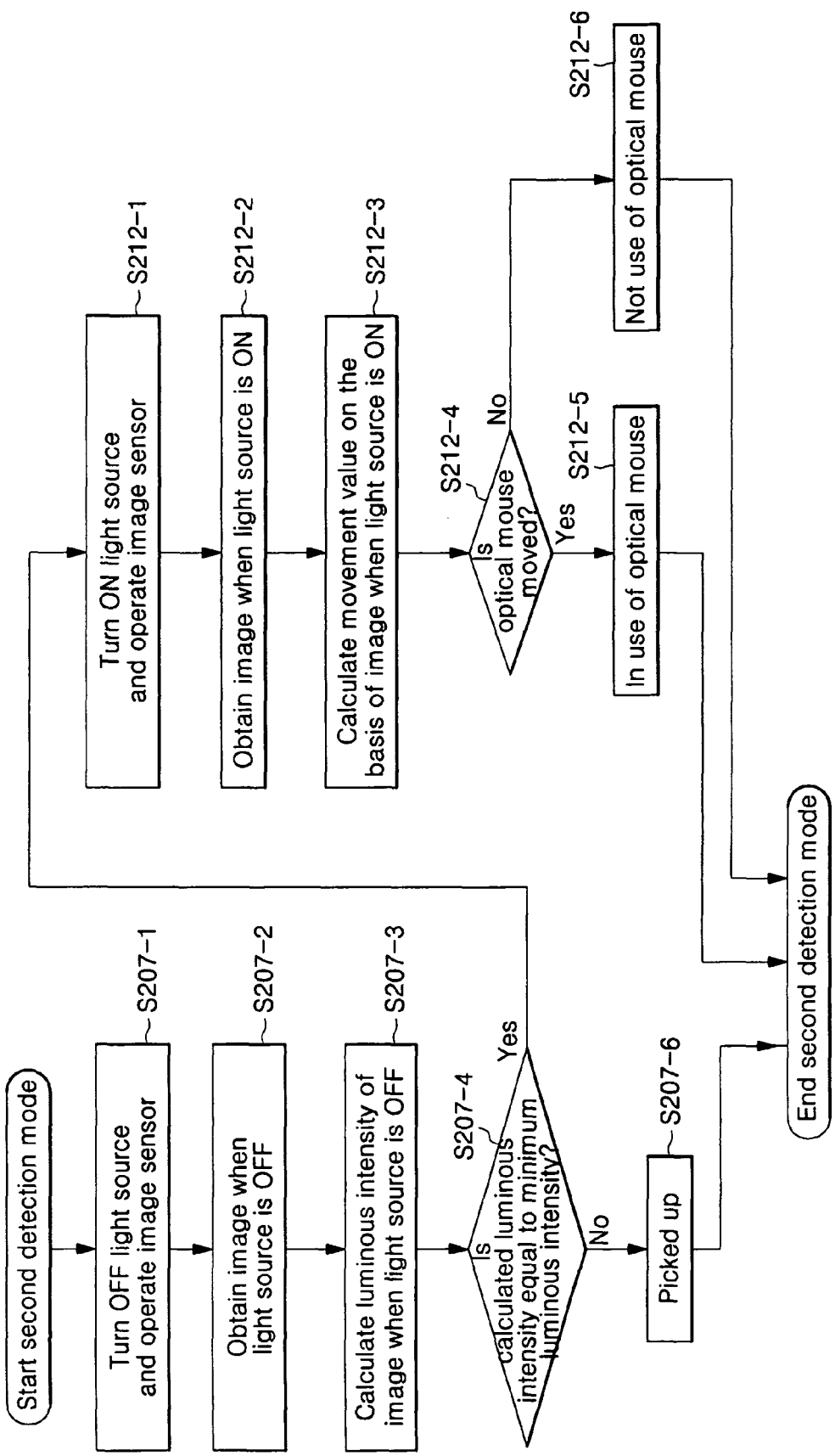

OPTICAL NAVIGATION DEVICE AND METHOD OF OPERATING THE SAME

CROSS-REFERENCE TO RELATED APPLICATION

This application claims priority to and the benefit of Korean Patent Application No. 2005-120762, filed Dec. 9, 2005, the disclosure of which is incorporated herein by reference in its entirety.

BACKGROUND OF THE INVENTION

1. Field of the Invention

The present invention relates to an optical navigation device and, more particularly, to an optical navigation device and a method of operating the same that are capable of preventing malfunction of the optical navigation device, which may be generated when the optical navigation device is spaced apart from a work surface, and minimizing unnecessary power consumption.

2. Description of the Related Art

An optical navigation device such as an optical mouse is a device for calculating a movement value from variation of an image of a work surface. Therefore, it is very important to precisely detect the image of the work surface. Hereinafter, the optical navigation device will be described using an optical mouse for the convenience of description.

As shown in FIG. 1, an optical mouse should be positioned on a work surface. A light source 8 radiates light 7 onto the work surface 2, and an image sensor 3 collects light 6 reflected by the work surface 2 through a lens 4 to precisely obtain an image of the work surface 2.

However, since the optical mouse is manipulated by a user's hand, the optical mouse may be spaced apart from the work surface by movement of the user's hand, and therefore, the optical mouse may obtain an inaccurate image of the work surface to calculate an incorrect movement value.

In addition, in order to minimize unnecessary power consumption, a conventional optical mouse operates in an inactive mode when the optical mouse does not operate during a predetermined time. However, when the optical mouse is spaced apart from the work surface, since an image irrelevant to movement of the optical mouse is detected due to peripheral illumination (for example, light of a fluorescent lamp), the optical mouse cannot operate in the inactive mode, even though there is no movement of the optical mouse.

SUMMARY OF THE INVENTION

In order to solve the foregoing and/or other problems, it is an aspect of the present invention to provide an optical navigation device and a method of operating the same that are capable of preventing malfunction of the optical navigation device and minimizing unnecessary power consumption, which may be generated when the optical navigation device is spaced apart from a work surface.

Additional aspect and advantages of the present invention will be set forth in part in the description which follows and, in part, will be obvious from the description, or may be learned by practice of the invention.

A first aspect of the present invention provides an optical navigation device including: a light source for irradiating light; an image sensor for collecting incident light to obtain an image; and a controller for performing a calculation mode that obtains an image when the light source is ON to calculate a movement value and determines whether the optical navigation device is moved on the basis of the movement value, a sleeping mode that turns OFF the light source and stops an operation of the image sensor, and a detection mode that obtains the image when the light source is ON and an image when the light source is OFF and then compares characteristics of the images to determine whether the optical navigation device is separated from a work surface, wherein the controller performs the calculation mode when the optical navigation device is moved and not separated from the work surface, performs the sleeping mode when not moved and separated from the work surface, and periodically performs the detection mode.

At this time, the controller may divide the detection mode into a first detection mode periodically performed during the calculation mode and a second detection mode periodically performed during the sleeping mode; compare characteristics of the image when the light source is ON and the image when the light source is OFF to determine whether the optical navigation device is separated from the work surface during the first detection mode; and compare characteristics of the image when the light source is ON and the image when the light source is OFF to determine whether the optical navigation device is separated from the work surface, and determine whether the optical navigation device is moved on the basis of the image when the light source is ON, during the second detection mode.

In addition, the controller may further include a compensation mode of obtaining a plurality of images when the light source is OFF and the optical navigation device is not separated from the work surface, and obtaining a minimum luminous intensity on the basis of statistics in which, for example, luminous intensities of each of the images when the light source is OFF are averaged. The controller may obtain the image when the light source is ON and the image when the light source is OFF during the first and second detection modes, compensate the image when the light source is OFF and the image when the light source is ON, and then compare characteristics of the compensated image when the light source is OFF with the compensated image when the light source is ON to determine whether the optical navigation device is separated from the work surface.

In addition, the controller may determine that the optical navigation device is separated from the work surface when image characteristics of the image when the light source is ON or OFF are changed depending on a peripheral illumination state, start the sleeping operation during the calculation mode, and maintain the sleeping operation during the sleeping mode.

A second aspect of the present invention provides an optical navigation device including: a light source for irradiating light; an image sensor for collecting incident light to obtain an image; and a controller for performing a compensation mode that obtains a minimum luminous intensity from each luminous intensity of a plurality of images when the light source is OFF and the optical navigation device is not separated from the work surface, a calculation mode that obtains an image when the light source is ON to calculate a movement value and determines whether the optical navigation device is moved on the basis of the movement value, a sleeping mode that turns OFF the light source and stops an operation of the image sensor, and a detection mode that obtains the image when the light source is OFF, compares the luminous intensity of the image when the light source is OFF with the minimum luminous intensity to determine whether the optical navigation device is separated from a work surface, wherein the controller performs the calculation mode when the optical navigation device is moved and not separated from the work surface, performs the sleeping mode when not moved and separated from the work surface, and periodically performs the detection mode.

At this time, the controller may divide the detection mode into a first detection mode periodically performed during the calculation mode and a second detection mode periodically performed during the sleeping mode; obtain the image when the light source is OFF to calculate luminous intensity, and then compare the calculated luminous intensity with the minimum luminous intensity to determine whether the optical navigation device is separated from the work surface, during the first detection mode; and obtain the image when the light source is OFF to calculate luminous intensity, compare the calculated luminous intensity with the minimum luminous intensity to determine the optical navigation device is separated from the work surface, and at the same time, obtain the image when the light source is ON to calculate a movement value to determine whether the optical navigation device is moved during the second detection mode.

In addition, the controller may determine that the optical navigation device is separated from the work surface when characteristics of the image when the light source is ON or OFF are changed depending on a peripheral illumination state, start the sleeping operation during the calculation mode, and maintain the sleeping operation during the sleeping mode.

A third aspect of the present invention provides a method of operating an optical navigation device including: a calculation step of obtaining an image when a light source is ON to calculate a movement value, and determining whether the optical navigation device is moved, on the basis of the calculated movement value; a sleeping step of turning OFF the light source and stopping the image obtaining; a first detection step of periodically enabling the optical navigation device during the calculation step, obtaining the image when the light source is OFF and the image when the light source is ON, comparing characteristics of each image to determine whether the optical navigation device is separated from a work surface, and starting the sleeping step when the optical navigation device is separated from the work surface; and a second detection step of periodically enabling the optical navigation device during the sleeping step, obtaining the image when the light source is OFF and the image when the light source is ON, comparing characteristics of each image to determine whether the optical navigation device is separated from the work surface, and at the same time, determining whether the optical navigation device is moved on the basis of the image when the light source is ON, so that the calculation step starts again when the optical navigation device is moved and not separated from the work surface.

In addition, the first detection step may include the steps of: obtaining the image when the light source is OFF and the image when the light source is ON; and determining that the optical navigation device is separated from the work surface when the image characteristics when the light source is OFF is similar to the image characteristics when the light source is ON, and the second detection step may include the steps of: obtaining the image when the light source is OFF and the image when the light source is ON; determining that the optical navigation device is separated from the work surface when the image characteristics when the light source is OFF is similar to the image characteristics when the light source is ON; and determining that the optical navigation device is not separated from the work surface when the image characteristics when the light source is OFF is different from the image characteristics when the light source is ON, and then calculating a movement value on the basis of the image when the light source is ON to determine whether the optical navigation device is moved on the basis of the calculated movement value.

In addition, the method may further include the step of a compensation step of obtaining a plurality of images when the light source is OFF, and obtaining a minimum luminous intensity on the basis of statistics in which, for example, luminous intensities of each of the images when the light source is OFF are averaged, the first detection step may further include the step of compensating the image when the light source is OFF using the minimum luminous intensity, and the second detection step may further include the step of compensating the image when the light source is OFF using the minimum luminous intensity.

Further, the calculation step may include the steps of: continuously obtaining the image when the light source is ON, and calculating and outputting a movement value; and determining whether the optical navigation device is moved on the basis of the calculated movement value.

A fourth aspect of the present invention provides a method of operating an optical navigation device including: a compensation step of obtaining a plurality of images when a light source is OFF, and obtaining a minimum luminous intensity on the basis of statistics in which, for example, luminous intensities of each of the images when the light source is OFF are averaged; a calculation step of obtaining an image when the light source is ON to calculate a movement value, and determining whether the optical navigation device is moved on the basis of the calculated movement value; a sleeping step of turning OFF the light source and stopping the image obtaining; a first detection step of periodically enabling the optical navigation device during the calculation step, obtaining the image when the light source is OFF, comparing the luminous intensity of the image when the light source is OFF with the minimum luminous intensity to determine whether the optical navigation device is separated from the work surface, and starting the sleeping step when the optical navigation device is separated from a work surface; and a second detection step of periodically enabling the optical navigation device during the sleeping step, obtaining the image when the light source is OFF, comparing the luminous intensity of the image when the light source is OFF with the minimum luminous intensity to determine whether the optical navigation device is separated from the work surface, and at the same time, determining whether the optical navigation device is moved on the basis of the image when the light source is ON, so that the calculation step starts again when the optical navigation device is moved and not separated from the work surface.

In addition, the first detection step may include the steps of: obtaining the image when the light source is OFF and the image when the light source is ON; calculating luminous intensity of the image when the light source is OFF; and determining that the optical navigation device is separated from the work surface when the calculated luminous intensity of the image when the light source is OFF is similar to the minimum luminous intensity, and the second detection mode may include the steps of: obtaining the image when the light source is OFF and the image when the light source is ON; calculating luminous intensity of the image when the light source is OFF; determining that the optical navigation device is separated from the work surface when the calculated luminous intensity of the image when the light source is OFF is similar to the minimum luminous intensity; and determining that the optical navigation device is not separated from the work surface when the calculated luminous intensity of the image when the light source is OFF is different from the minimum luminous intensity, and then calculating a movement value on the basis of the image when the light source is ON to determine whether the optical navigation device is moved on the basis of the calculated movement value.

Further, the calculation step may include the steps of: continuously obtaining the image when the light source is ON, and calculating and outputting a movement value; and determining whether the optical navigation device is moved on the basis of the calculated movement value.

BRIEF DESCRIPTION OF THE DRAWINGS

These and/or other aspects and advantages of the present invention will become apparent and more readily appreciated from the following description of the embodiments, taken in conjunction with the accompanying drawings of which:

FIG. 13 is a flowchart illustrating the operation of a second detection mode of a controller of FIG. 11.

DETAILED DESCRIPTION OF THE INVENTION

Hereinafter, a conventional optical mouse will be used to describe an optical navigation device and a method of operating the same in accordance with the present invention with reference to the accompanying drawings, for convenience of description. But, this invention is not limited to an optical mouse and can be applied to any optical navigation device.

Figure 1:
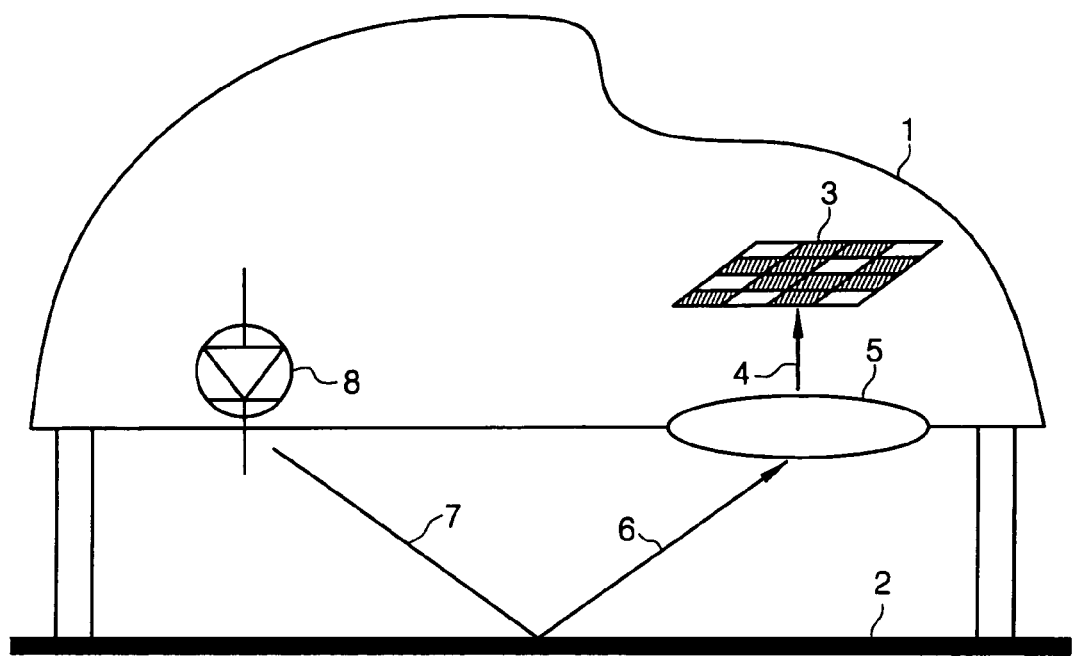
FIG. 1 is a diagram illustrating the operation of an optical mouse.
Figure 2:
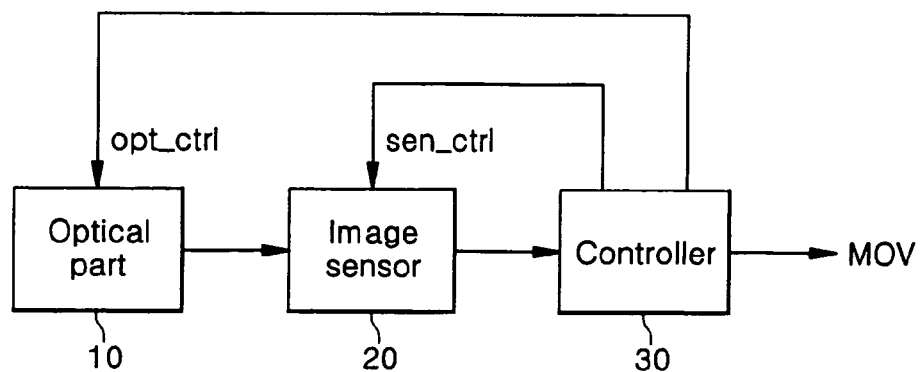
FIG. 2 is a block diagram of a conventional optical mouse.

FIG. 2 is a block diagram of a conventional optical mouse, which includes an optical part 10, an image sensor 20, and a controller 30.

The optical part 10 is composed of a light source, a lens, and other attachments. The light source radiates light in response to a light control signal opt_ctrl, and the lens collects the light entering the optical mouse to transmit the light to the image sensor 20.

The image sensor 20 includes a plurality of pixels, each of which accumulates luminous intensity transmitted from the optical part 10 in response to a sensor control signal sen_ctrl to generate an image.

The controller 30 receives the image, calculates a movement value MOV of the optical mouse to output it, determines whether the optical mouse is moved using the calculated movement value MOV, and generates an optical control signal opt_ctrl and a sensor control signal sen_ctrl for determining operating states of the light source and the image sensor.

Figure 3:
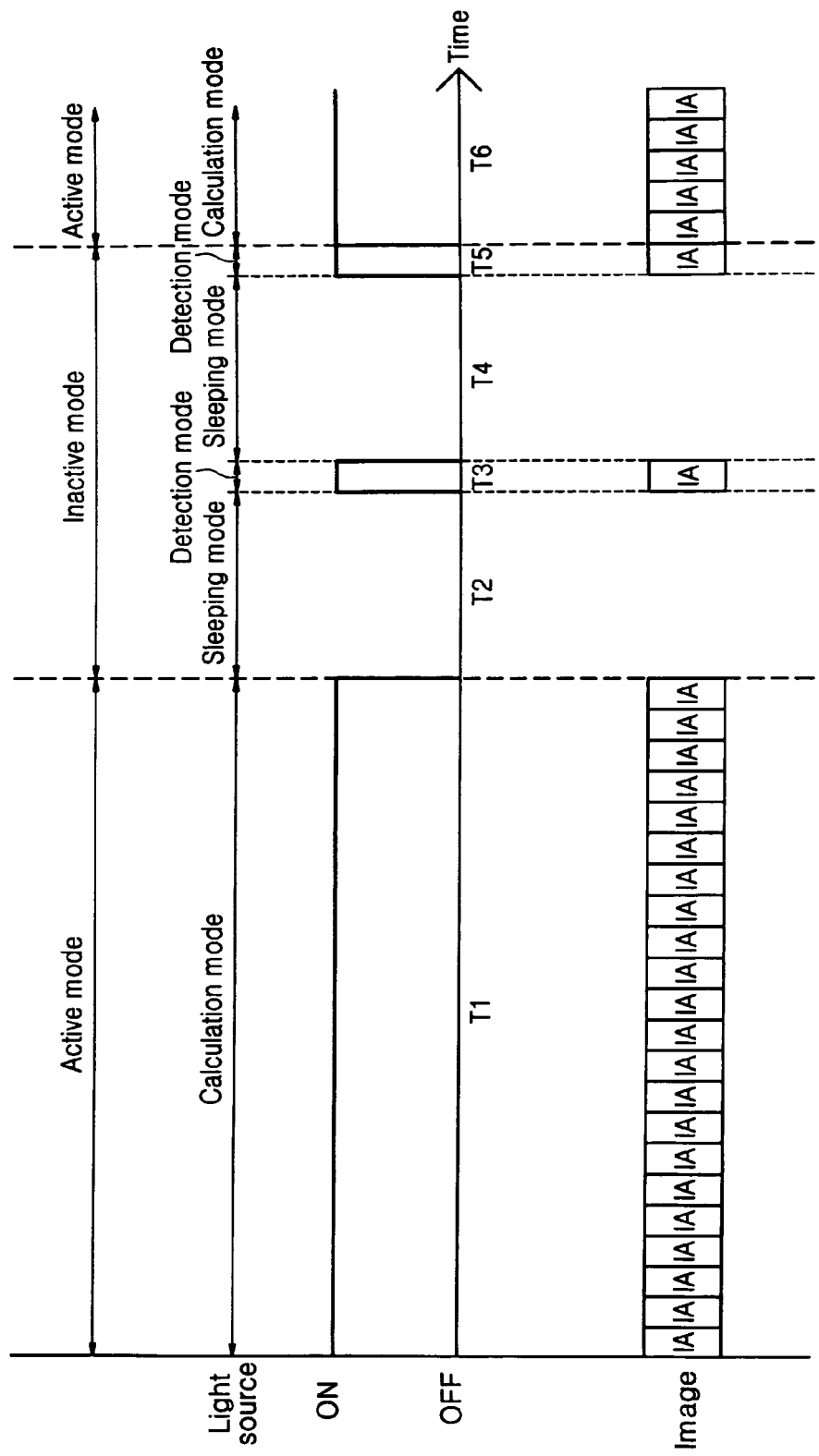
FIG. 3 is a conceptual diagram illustrating an operation mode of a controller of FIG. 2.

FIG. 3 is a conceptual diagram illustrating an operation mode of the controller of FIG. 2, and the controller 30 divides an operating state of the optical mouse into an active state and an inactive state depending on whether the optical mouse is moved.

In the active state, the controller 30 performs a calculation mode to turn ON the light source and operate the image sensor to continuously obtain an image while the light source is ON, and calculates and outputs a movement value using the image continuously obtained while the light source is ON (T1 and T6 sections).

When the optical mouse is not moved within a predetermined time, the optical mouse is in the inactive state to perform a sleeping mode (T2 and T4 sections) and periodically perform a detection mode (T3 and T5 sections).

During the sleeping mode (T2 and T4 sections), the optical mouse turns OFF the light source to prevent unnecessary power consumption. During the detection mode (T3 and T5 sections), the optical mouse turns ON the light source and operates the image sensor to obtain one image when the light source is ON, and calculates a movement value using the obtained image to determine whether the optical mouse is moved.

As a result of the determination of the detection mode (T3 and T5 sections), when it is determined that the optical mouse is moved, the controller is returned to an active state to perform a calculation mode (T6 section), and when it is determined that the optical mouse is not moved, the controller maintains the sleeping mode (T4 section).

As described above, the conventional optical mouse obtains an image of a work surface using luminous intensity of the light source reflected from the work surface, and calculates a movement value on the basis of the image and determines whether the optical mouse is in an inactive state.

However, since the optical mouse of FIG. 2 cannot detect whether the optical mouse is spaced apart from the work surface as described above, the optical mouse may continuously perform the unnecessary calculation mode, and may also calculate an incorrect movement value according to light of peripheral illumination (for example, light of a fluorescent lamp) having periodically varied luminous intensity.

Therefore, a controller 30' of an optical mouse of the present invention further performs a detection mode for periodically determining whether the optical mouse is separated from the work surface. In addition, the controller can detect even when light of peripheral illumination, in particular, light of a fluorescent lamp having a luminous intensity that varies depending on an operating frequency even though the optical mouse has been separated from the work surface, is received to calculate an incorrect movement value.

Furthermore, the controller 30' of the optical mouse of the present invention further performs a compensation mode to prevent inaccurate detection of the separation from the work surface of the optical mouse due to process dispersion of an image sensor and operational environment of the optical mouse.

Figure 4:
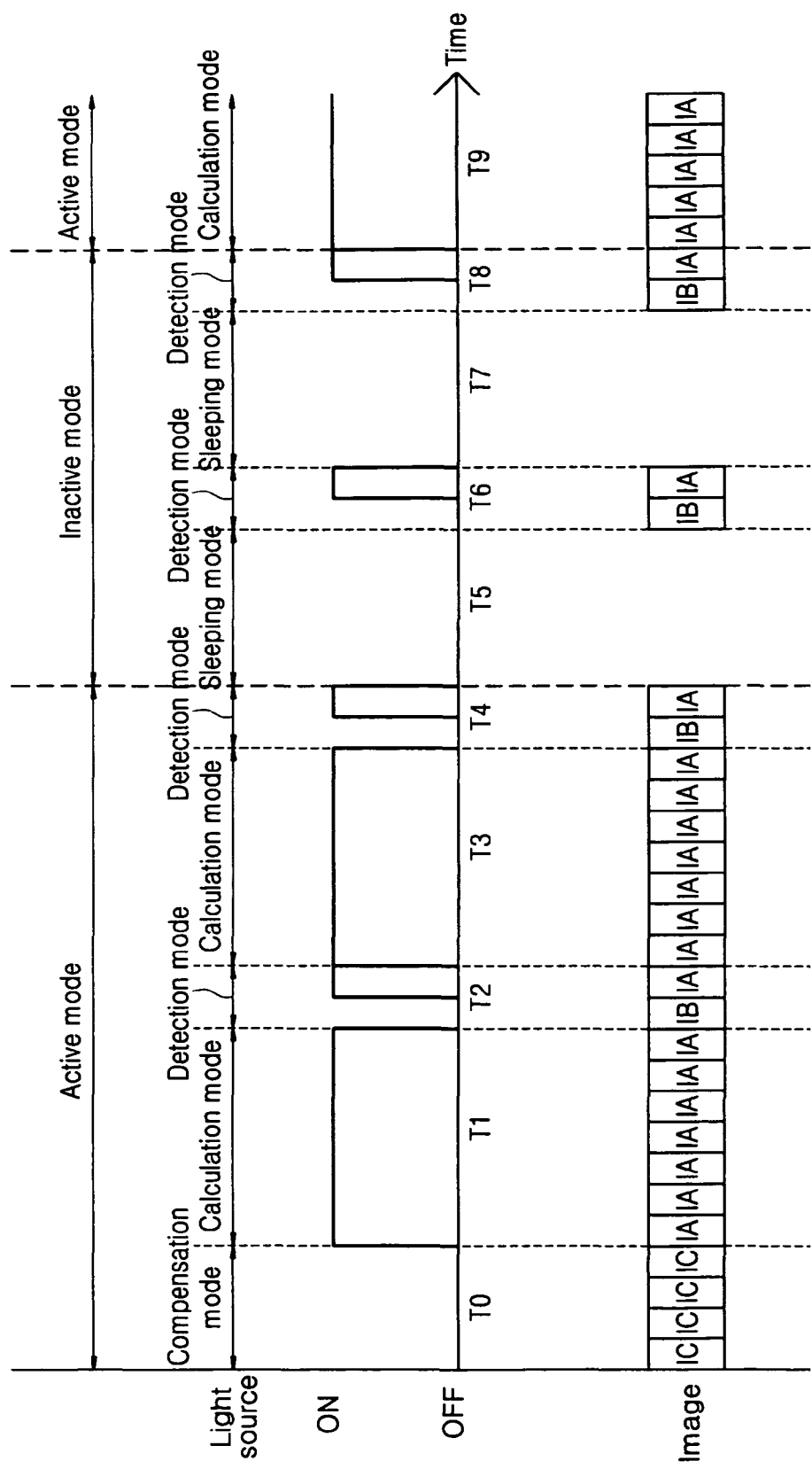
FIG. 4 is a conceptual diagram illustrating an operation mode of a controller of an optical mouse in accordance with an exemplary embodiment of the present invention.

FIG. 4 is a conceptual diagram illustrating an operation mode of a controller 30' of an optical mouse in accordance with an exemplary embodiment of the present invention. Referring to FIG. 4, the controller 30' classifies an operation of the optical mouse into an active state and an inactive state depending on separation from the work surface and movement of the optical mouse.

In the active state, the controller 30' performs a compensation mode (T0 section), basically performs a calculation mode (T1, T3 and T9 sections), and periodically performs a first detection mode (T2 and T4 sections). Preferably, the compensation mode is performed when the optical mouse is powered up or when it is requested by a user. If necessary, the compensation mode may be periodically performed.

During the compensation mode, the controller 30' operates an image sensor 20 only to obtain a plurality of images IC when a light source is OFF, and then averages each luminous intensity of the plurality of images IC to obtain a minimum luminous intensity (T0 section). The terms "average" and "minimum" are used herein for convenience of description. Other statistics can be also used. For one example, an image having only few bad pixels generates the maximum value or the minimum value of a pixel data. Accordingly, the maximum value and the minimum value can be excluded from making statistics. For another example, most frequently generated pixel data can be used as the average value.

During the calculation mode, the controller 30' operates the light source and the image sensor to continuously obtain an image IA when the light source is ON, and calculates a movement value using the image to output the movement value. Then, the controller 30' analyzes the calculated movement value to determine whether the optical mouse is moved, and at the same time, detects whether the luminous intensity of the image when the light source is ON is changed to a peripheral illumination state, thereby determining whether the optical mouse is separated from the work surface (T1, T3 and T9 sections). Therefore, when the optical mouse is not moved or separated from the work surface within a predetermined time, the optical mouse is in an inactive state.

Figure 5:
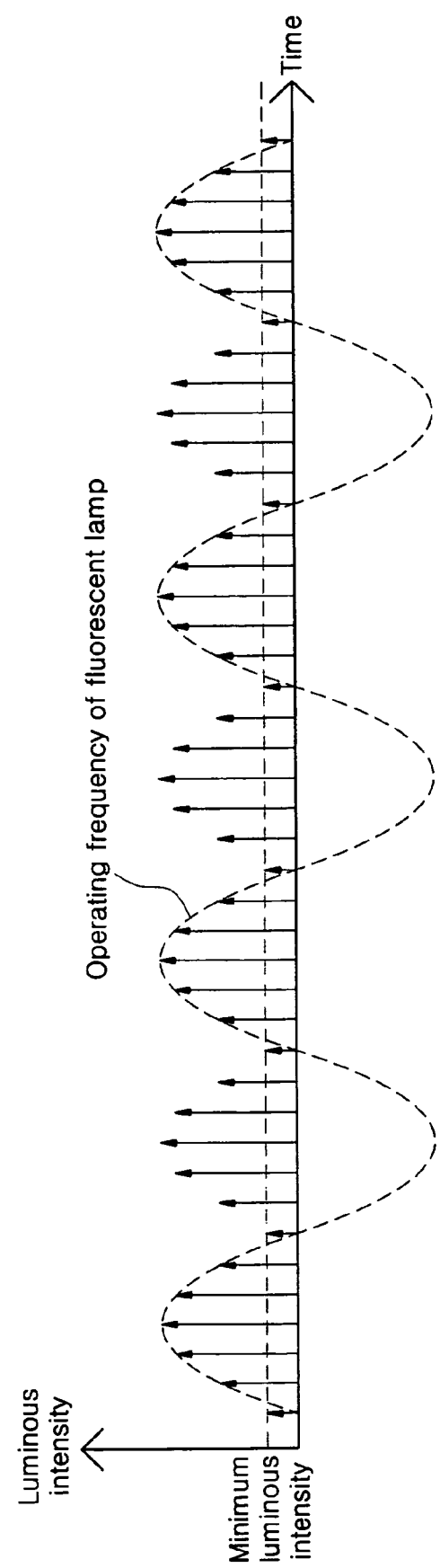
FIG. 5 is a diagram representing the variation of luminous intensity when a light source is ON depending on the frequency of a fluorescent lamp.

In this process, the peripheral illumination state is a state in which variation in luminous intensity of the peripheral illumination operated by receiving power supplied from the exterior is equal to variation in luminous intensity of the image when the light source is ON. That is, as shown in FIG. 5, when the peripheral illumination is a fluorescent lamp having a luminous intensity that varies at a frequency of 60 Hz, for example, and the luminous intensity of the image when the light source is ON is equal to the minimum luminous intensity calculated in a cycle of "1/(operating frequency of the fluorescent lamp (60 Hz, for example,)×2) during the compensation mode, the controller 30' determines that the luminous intensity of the image when the light source is ON is changed to the peripheral illumination state.

In the first detection mode, the controller 30' operates the image sensor 20 only to obtain an image IB when the light source is OFF, operates both the light source and the image sensor 20 to obtain an image IA when the light source is ON, and then, compensates the image IB when the light source is OFF with the minimum luminous intensity.

Then, it is determined whether the compensated image IB' when the light source is OFF is similar to the image IA when the light source is ON to determine whether the optical mouse is separated from the work surface (T2 and T4 sections). As a result of the determination, when the optical mouse is separated from the work surface, the optical mouse is in an inactive state (T5~T8 sections).

As described above, the controller 30' continuously determines whether the optical mouse is separated from the work surface, even in the active state.

In the inactive state, the controller 30' basically performs a sleeping mode (T5 and T7 sections), and periodically performs a second detection mode (T6 and T8 sections).

In the sleeping mode, the controller 30' turns OFF the light source, and stops an operation of the image sensor 20 to minimize unnecessary power consumption (T5 and T7 sections). That is, in the sleeping mode, the controller 30' operates the optical mouse in a standby state.

In the second detection mode, the controller 30' obtains the image IB' when the light source is OFF and the image IA when the light source is ON, similar to the operation of the first detection mode, and determines whether their image characteristics are similar to each other to determine whether the optical mouse is separated from the work surface. At the same time, the controller 30' calculates a movement value using the image when the light source is ON, and then, analyzes the calculated movement value to determine whether the optical mouse is moved (T6 and T8 sections). As a result of the determination, when the optical mouse is moved in a state that the optical mouse is not separated from the work surface, the controller 30' is returned to the active state (T9 section).

In the case that the optical mouse is positioned on a work surface, since the optical mouse can receive light from the light source only, luminous intensity that can be received by the optical mouse is different depending on ON/OFF of the light source. That is, the image IB when the light source is OFF and the image IA when the light source is ON have different image characteristics. On the other hand, when the optical mouse is spaced apart from the work surface, since the optical mouse receives light from the light source and peripheral illuminations to generate an image, the optical mouse obtains images having similar image characteristics regardless of ON/OFF of the light source.

Therefore, in the first and second detection modes, the optical mouse can determine whether the image when the light source is OFF and the image when the light source is ON are similar to each other, thereby determining whether the optical mouse is separated from the work surface.

The operation of the controller 30' having the operation mode of FIG. 4 will now be described with reference to FIG. 6.

When power is applied to the optical mouse, the controller 30' is first in an active state (S101) to perform a compensation mode, and then, perform a calculation mode.

When the power is applied to the optical mouse, the controller 30' performs the compensation mode (S102) to obtain a plurality of images when the light source is OFF, and averages luminous intensity of each of the images to calculate the minimum luminous intensity (S103).

After performing step S103, the controller 30' performs the calculation mode (S104) to continuously obtain images when the light source is ON, and compares the image previously obtained when the light source is ON with the image currently obtained when the light source is ON to calculate and output a movement value. Then, the controller 30' determines whether the optical mouse is moved on the basis of the calculated movement value, and at the same time, detects whether the luminous intensity of the image when the light source is ON is changed into a peripheral illumination state, thereby determining whether the optical mouse is separated from the work surface (S105).

As a result of the determination of step S105, when the optical mouse is not moved or is separated from the work surface for a predetermined time, the controller 30' terminates the calculation mode to be in an inactive state (S109) in order to prevent malfunction of the optical mouse and minimize unnecessary power consumption.

On the other hand, as a result of the determination of step S105, when the optical mouse is continuously moved and the luminous intensity of the image when the light source is ON is not changed into the peripheral illumination state, it is determined whether the optical mouse is normally moved on the work surface by a user, and whether the first detection mode is to be started (S106).

In the case that the first detection mode is not yet started, the controller 30' is returned to step S104 to continuously perform the calculation mode, and when the first detection mode starts, the controller 30' performs the first detection mode (S107) to continuously obtain the compensated images when the light source is OFF and when the light source is ON, and determines whether image characteristics of the compensated images when the light source is OFF and when the light source is ON are similar to each other to determine whether the optical mouse is separated from the work surface (S108).

As a result of the determination of step S108, when the optical mouse is not separated from the work surface, the controller 30' is returned to step S104 to continuously perform the calculation mode, and when the optical mouse is separated from the work surface, the controller 30' is in the inactive state (S109) in order to prevent malfunction of the optical mouse.

As a result of the determination of steps S105 and S108, when the optical mouse is not moved or is separated from the work surface for a predetermined time, the controller 30' stops operations of the light source and the image sensor 20, i.e., performs a sleeping mode for operating the optical mouse in a standby state to minimize malfunction of the optical mouse and unnecessary power consumption (S110).

Then, as time goes by, it is determined whether the second detection mode is to be started (S111), and if the second detection mode is not yet started, the controller 30' continuously performs the sleeping mode (S110).

On the other hand, when the second detection mode is to be started, the controller 30' performs the second detection mode (S112) to continuously obtain the compensated images when the light source is OFF and ON, compares characteristics of the respective images to determine whether the optical mouse is separated from the work surface, and at the same time, calculates a new movement value from the image when the light source of ON to determine whether the optical mouse is moved (S113).

As a result of the determination of step S113, when the optical mouse is not moved or is separated from the work surface, the controller 30' performs again the sleeping mode, and when the optical mouse is moved or not separated from the work surface, the controller 30' determines whether the optical mouse is normally moved on the work surface by a user, and is returned to the active state to perform the calculation mode (S103).

As described above, the optical mouse of FIG. 6 not only periodically performs the first and second detection modes to periodically detect whether the optical mouse is separated from the work surface but also continuously detects whether the optical mouse is separated from the work surface even in the calculation mode, thereby minimizing malfunction and unnecessary power consumption of the optical mouse, which may be generated due to the separation of the optical mouse.

A method of operating a controller according to each operation mode will now be described with reference to FIGS. 6 to 9.

Figure 6:
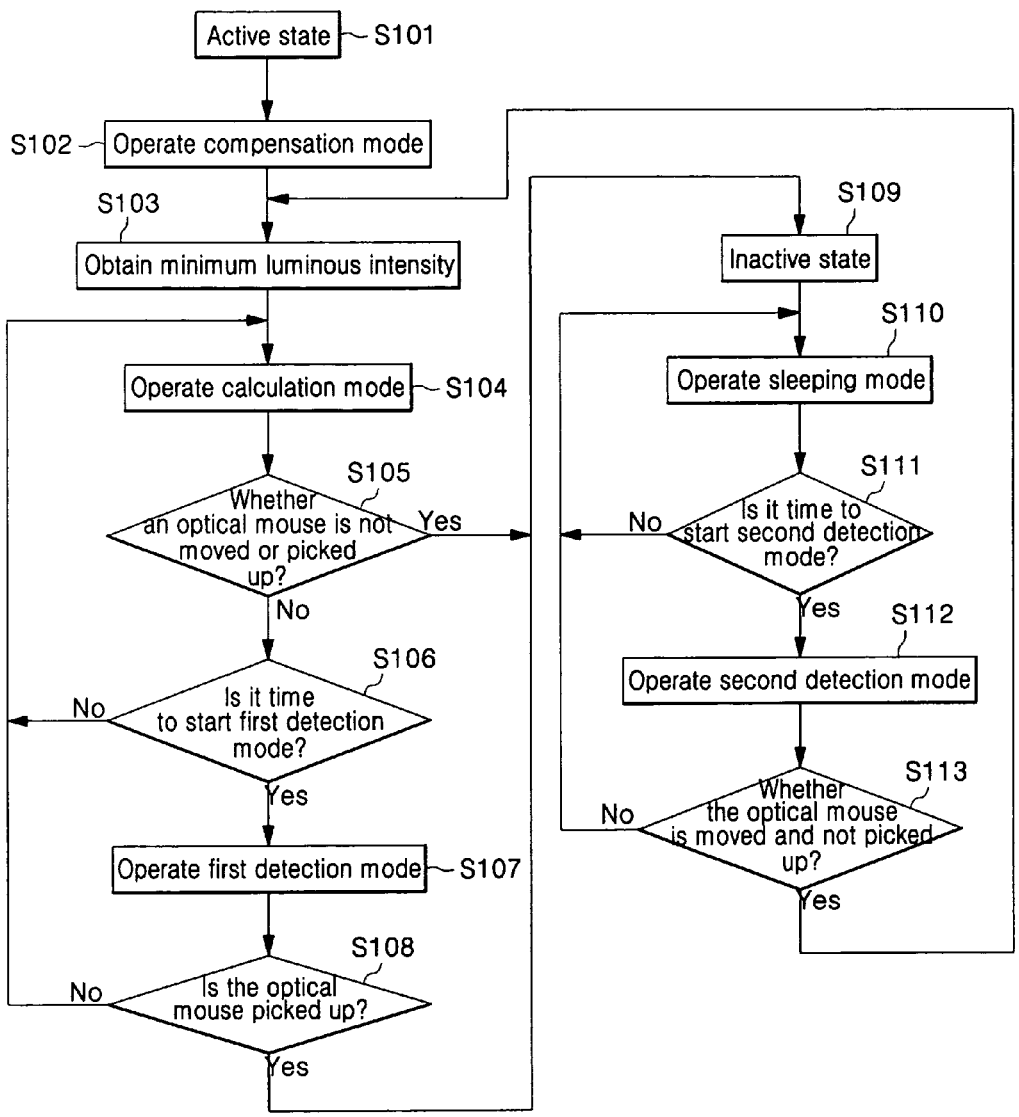
FIG. 6 is a diagram illustrating the operation of a controller having the operation mode of FIG. 4.
Figure 7:
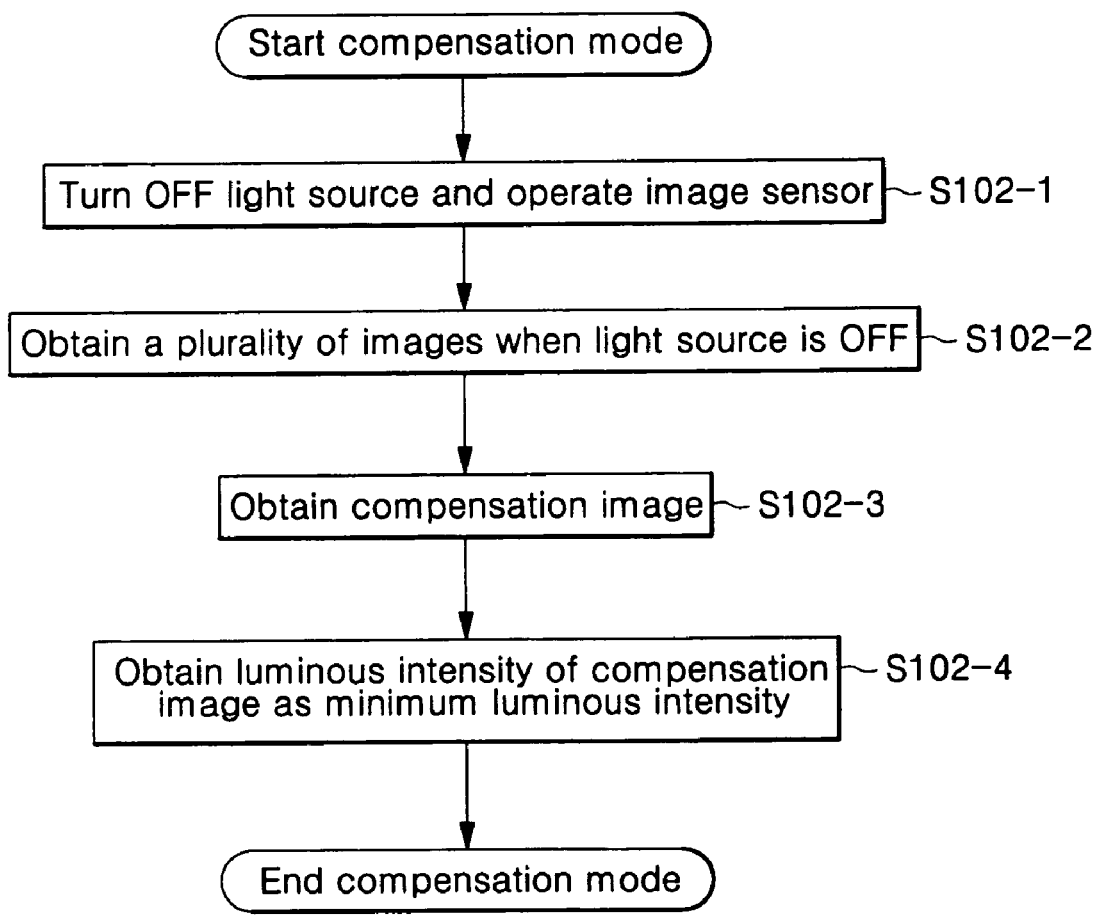
FIG. 7 is a flowchart illustrating the operation of a compensation mode of FIG. 6.

FIG. 7 is a flowchart illustrating the operation of the compensation mode (S102) of FIG. 6.

When the compensation mode starts, the controller 30' operates the image sensor 20 only, i.e., operates the image sensor 20 in a state that the light source is OFF (S102-1), to obtain a plurality of images when the light source is OFF (S102-2).

The controller 30' averages the plurality of images when the light source is OFF to generate an average image, and obtains the generated average image as a compensation image (S102-3).

Then, the controller 30' averages each luminous intensity of a plurality of pixels in the compensation image to calculate the minimum luminous intensity (S102-4), and then, terminates the compensation mode.

Therefore, the average image obtained by step S102-3 is a reference value of the image when the light source is OFF, and the minimum luminous intensity obtained by step S102-4 is a reference value of the luminous intensity of the image when the light source is OFF.

While the optical mouse obtains images of the same work surface under the same operating condition, the optical mouse obtains images having different luminous intensities depending on process distribution of the image sensor 20 and operating environment of the optical mouse. As a result, since the reference value of the image when the light source is OFF is inaccurate, the controller 30' may inaccurately detect whether the optical mouse is separated from the work surface.

Therefore, the optical mouse of the present invention calculates the minimum luminous intensity through the compensation mode to determine the minimum luminous intensity of the image when the light source is OFF that varies depending on process distribution of the image sensor 20 and operating environment of the optical mouse, thereby precisely detecting whether the optical mouse is separated from the work surface. For example, in a transparent mouse, ambient light can be added to the light source. In this case, the effect of ambient light can be eliminated by an operation of the compensation mode.

Figure 8:
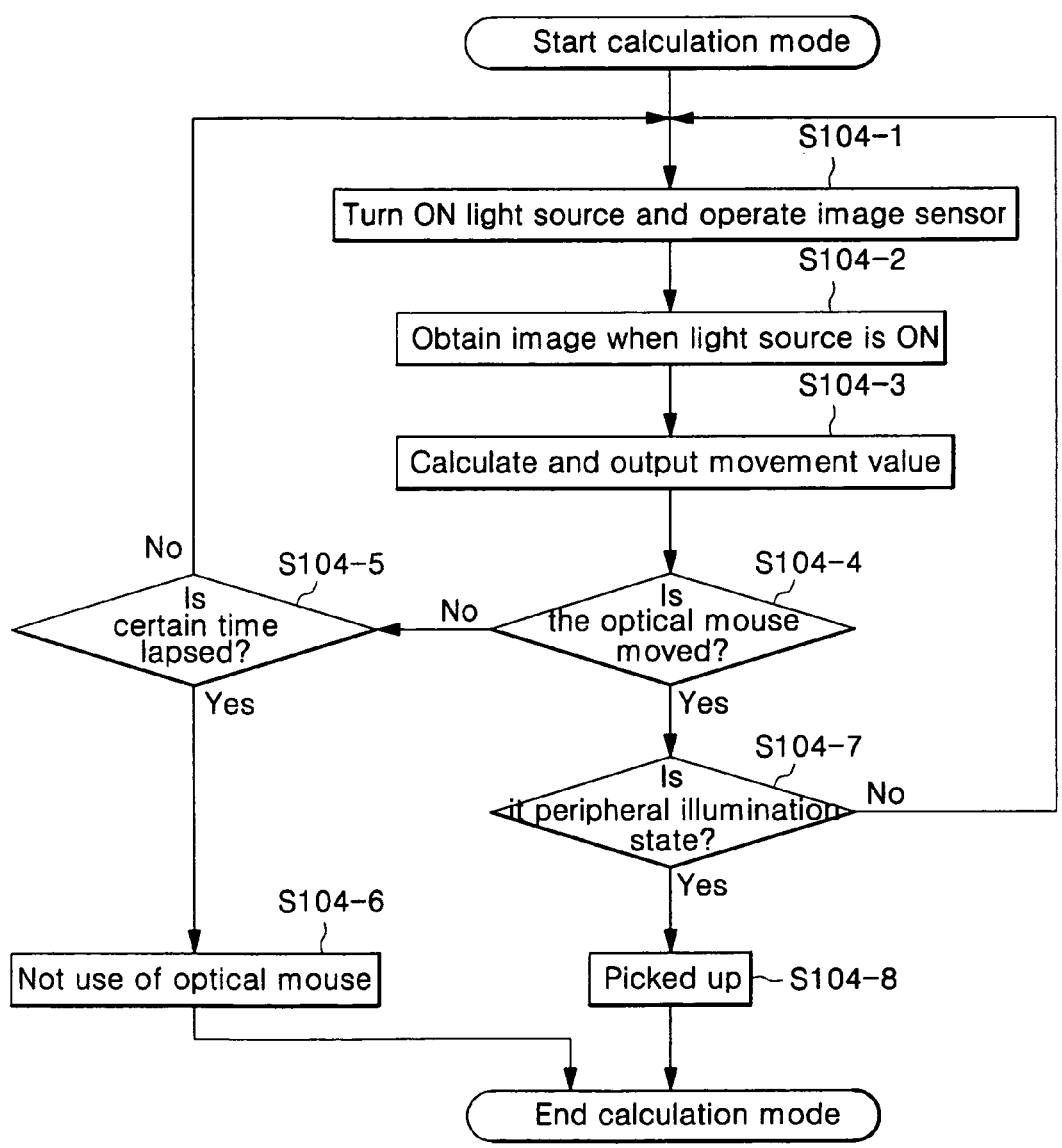
FIG. 8 is a flowchart illustrating the operation of a calculation mode of FIG. 6.

FIG. 8 is a flowchart illustrating the operation of the calculation mode (S104) of FIG. 6.

When the calculation mode starts, the controller 30' operates both the light source and the image sensor 20, i.e., continuously operates the image sensor 20 in a state that the light source is ON (S104-1) to continuously obtain an image when the light source is ON (S104-2).

Then, the controller 30' compares the previously obtained image when the light source is ON with the currently obtained image to obtain an image variation amount, and calculates and outputs a movement value of the optical mouse using the image variation amount (S104-3).

Next, the controller 30' analyzes the movement value calculated by step S104-3 to determine whether the optical mouse is moved (S104-4), and when the optical mouse is not moved, the controller 30' checks whether a predetermined time lapses (S104-5).

As a result of the determination of step S104-5, when the optical mouse is not moved for a predetermined time, the controller 30' determines that a user does not use the optical mouse (S104-6) and completes the calculation mode.

On the other hand, when the predetermined time does not lapse, the controller 30' is returned to step S104-1 to re-calculate a movement value of the optical mouse, and re-determine whether the optical mouse is moved using the movement value.

Then, as a result of the determination of step S104-4, when movement of the optical mouse is detected, the controller 30' determines that the user use the optical mouse, and further checks whether the luminous intensity of the image when the light source is ON is changed into the peripheral illumination state (S104-7).

In step S104-7, when the luminous intensity of the image when the light source is ON is equal to the minimum luminous intensity obtained in compensation mode of FIG. 7 in a cycle of "1/(operating frequency of the fluorescent lamp (60 Hz, for example,)×2)" as described in FIG. 5, the controller 30' determines that the light source is changed into the peripheral illumination state.

When the luminous intensity of the image when the light source is ON is changed into the peripheral illumination state, the controller 30' determines that the optical mouse is spaced apart from the work surface to receive light of the fluorescent lamp to generate an image (S104-8), and then terminates the calculation mode.

On the other hand, in step S104-7, when the luminous intensity of the image when the light source is ON is not changed into the peripheral illumination state, the controller 30' determines that the optical mouse is normally moved on the work surface, and is returned to step S104-1 to continuously calculate a movement value of the optical mouse.

As described above, the controller of the present invention determines whether the luminous intensity of the image when the light source is ON is changed into the peripheral illumination state even while the calculation mode is operated, thereby determining whether the optical mouse is separated from the work surface.

Figure 9:
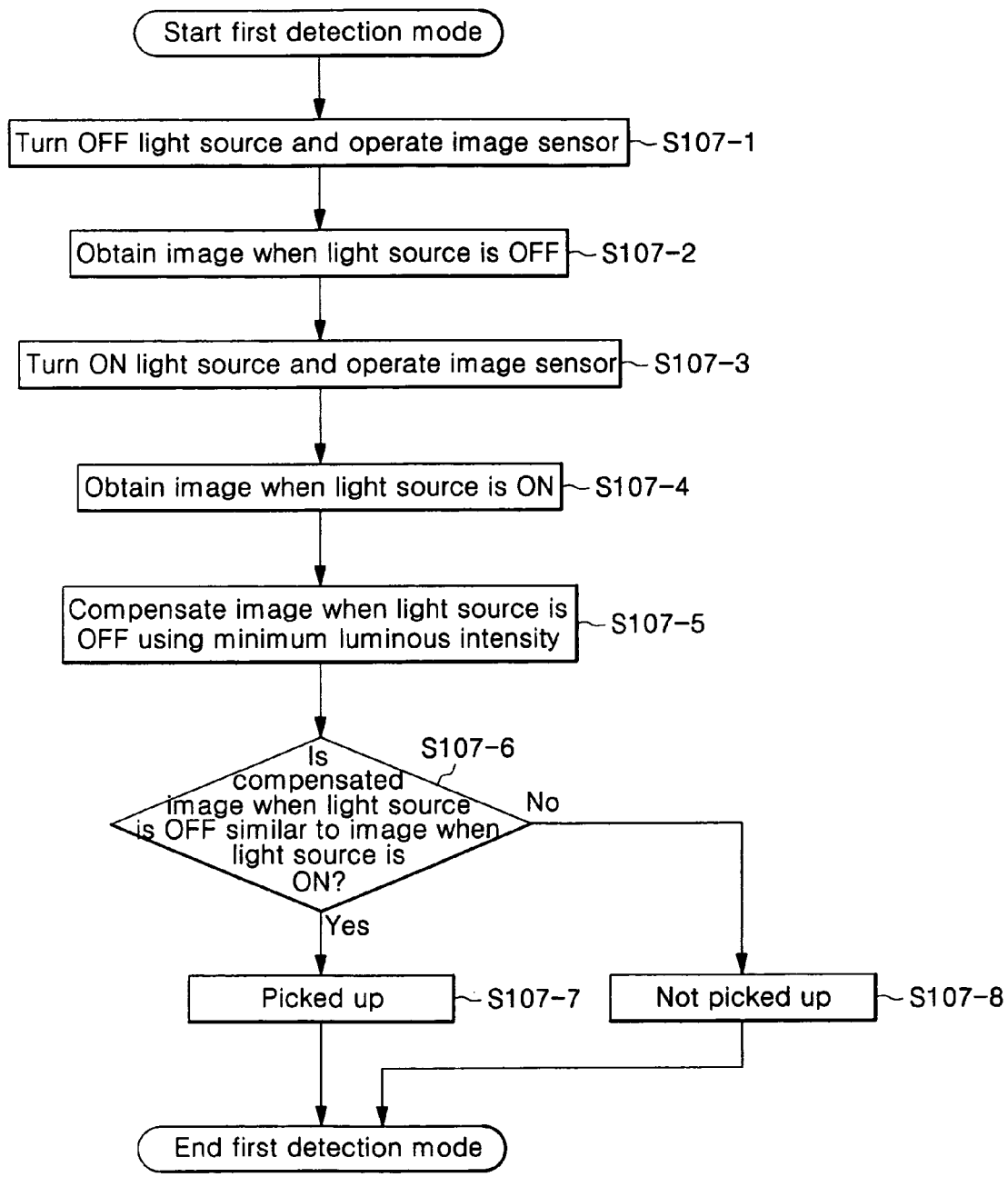
FIG. 9 is a flowchart illustrating the operation of a first detection mode of FIG. 6.

FIG. 9 is a flowchart illustrating the operation of the first detection mode S107 of FIG. 6.

When the first detection mode starts, the controller 30' operates the image sensor 20 only, i.e., operates the image sensor in a state that the light source is OFF (S107-1), to obtain an image when the light source is OFF (S107-2).

Then, the controller 30' operates both the light source and the image sensor 20, i.e., operates the image sensor 20 in a state that the light source is ON (S107-3), to obtain an image when the light source is ON (S107-4).

After step S107-4, the controller 30' compensates each luminous intensity of a plurality of pixels in the image when the light source is OFF and the image when the light source is ON using the minimum luminous intensity (S107-5), and determines whether the compensated images when the light source is OFF and ON have image characteristics similar to each other (S107-6).

As a result of the determination of step S107-6, when the image characteristics of the compensated images when the light source is OFF and ON are similar to each other, the controller 30' determines that the optical mouse is spaced apart from the work surface to generate an image using light of the peripheral illumination (for example, light of a fluorescent lamp). That is, after determining that the optical mouse is separated from the work surface (S107-7), the first detection mode is terminated.

On the other hand, as a result of the determination of step S107-6, when the image characteristics of the compensated images when the light source is OFF and ON are different from each other, the controller 30' determines that the optical mouse is positioned on the work surface to generate an image using light of the light source. That is, after determining that the optical mouse is in a normal state (S107-8), the first detection mode is terminated.

As described above, the controller 30' the present invention further performs the first detection mode of FIG. 9 during the calculation mode, and when the optical mouse is separated from the work surface to receive light of the peripheral illumination, other than light of the light source, the controller 30' determines whether the optical mouse is separated from the work surface, using similar image characteristics obtained regardless of ON/OFF of the light source.

Figure 10:
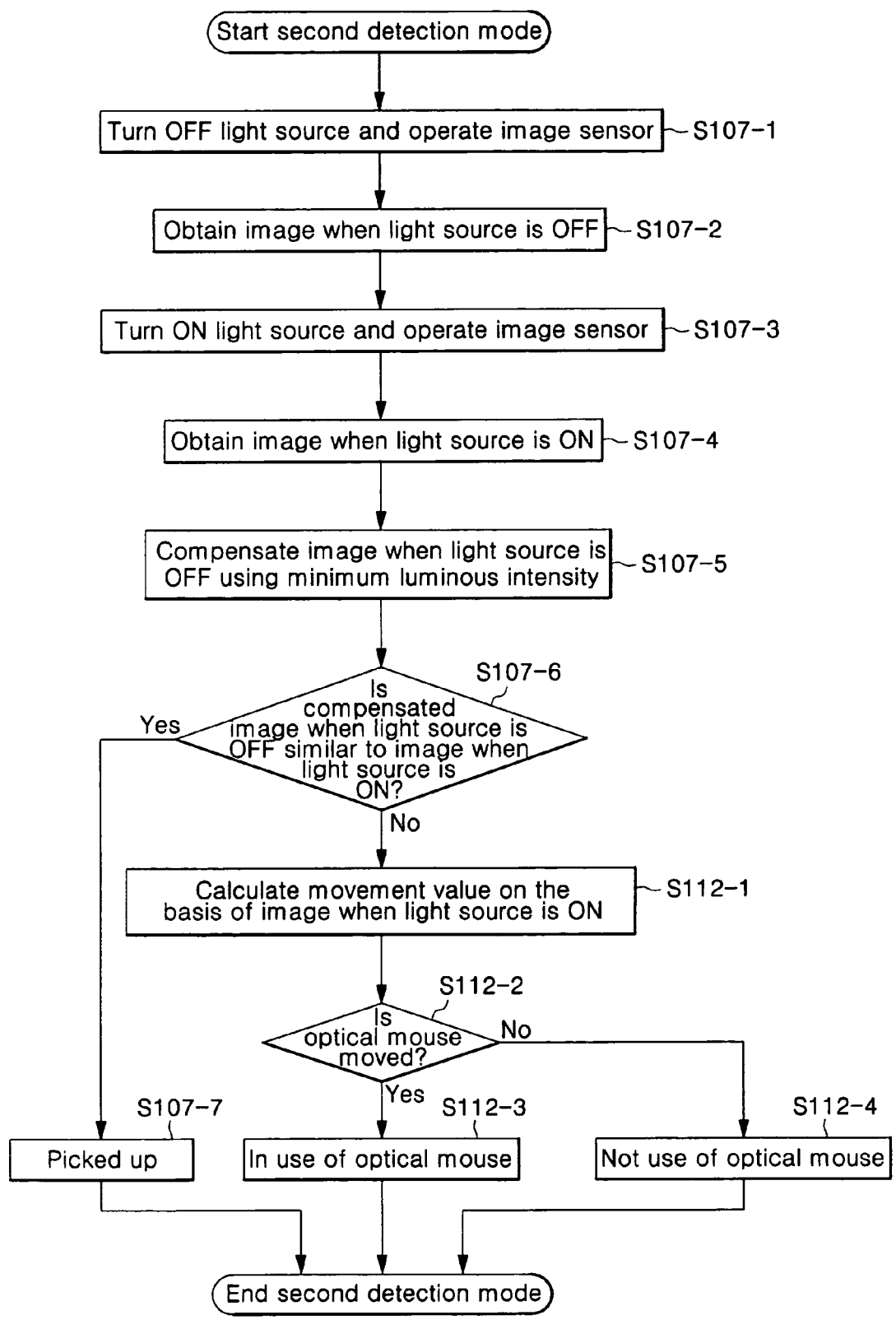
FIG. 10 is a flowchart illustrating the operation of a second detection mode of FIG. 6.

FIG. 10 is a flowchart illustrating the operation of the second detection mode (S112) of FIG. 6.

During the second detection mode, the controller 30' determines whether the optical mouse is separated from the work surface, similarly to the first detection mode (S107) of FIG. 9, and further determines whether the optical mouse is moved.

Therefore, when the second detection mode starts, the controller 30' performs steps S107-1 to S107-7, similarly to the first detection mode, and further performs steps S112-1 to S112-4 for determining whether the optical mouse is moved, according to the determination of step S107-6.

As a result of the determination of step S107-6, when the compensated images when the light source is OFF and ON have different image characteristics, the controller 30' determines that the optical mouse is positioned on the work surface, and further calculates a movement value of the optical mouse using the image when the light source is ON (S112-1).

The controller 30' determines whether the optical mouse is moved, using the movement value of the optical mouse calculated by step S112-1 (S112-2), and when the optical mouse is moved, the controller 30' determines that a user uses the optical mouse (S112-3), and then terminates the second detection mode to perform again the calculation mode.

On the other hand, when the optical mouse is not moved, the controller 30' determines that a user does not use the optical mouse (S112-4), and then terminates the second detection mode to continuously perform the sleeping mode.

As described above, the controller of the present invention further performs the second detection mode of FIG. 10 even in the sleeping mode to periodically determine whether the optical mouse is moved and the optical mouse is separated from the work surface.

Consequently, the optical mouse of the present invention performs the calculation mode and the sleeping mode depending on whether the optical mouse is moved, and further performs the first and second detection modes to more precisely detect whether the optical mouse is separated from the work surface. In addition, the controller determines whether the optical mouse is moved in the peripheral illumination state even in the calculation mode, thereby determining whether the optical mouse is separated from the work surface.

Figure 11:
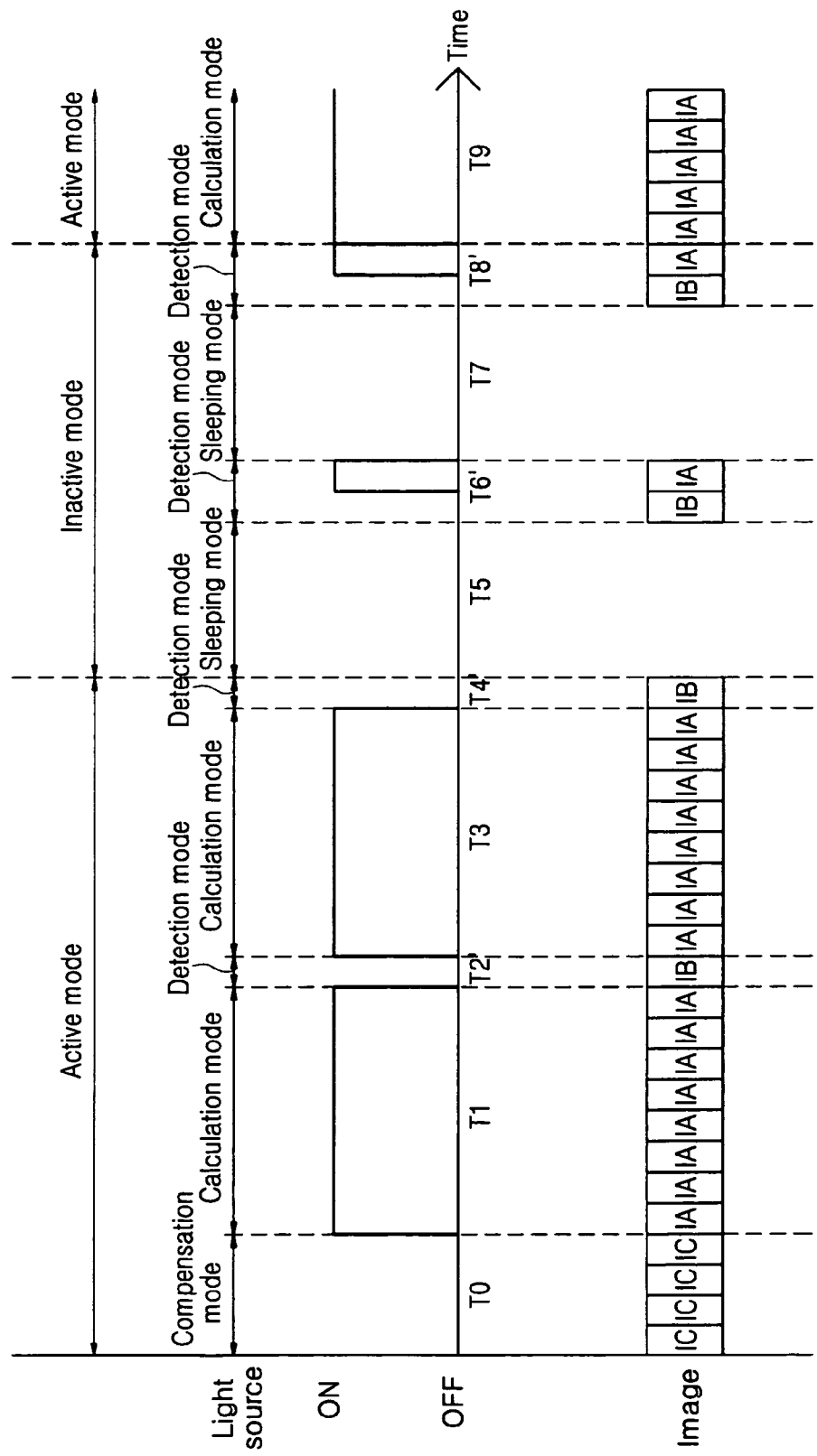
FIG. 11 is a conceptual diagram illustrating an operation mode of a controller of an optical mouse in accordance with another exemplary embodiment of the present invention.

FIG. 11 is a conceptual diagram illustrating an operation mode of a controller 30' of an optical mouse in accordance with another embodiment of the present invention.

The controller 30' of FIG. 11 performs a compensation mode (T0 section), a calculation mode (T1, T3 and T9 sections), and a first detection mode (T2' and T4' sections) during an active state, and performs a sleeping mode (T5 and T7 sections), and a second detection mode (T6' and T8' sections) during an inactive state, similarly to the controller 30' of FIG. 4. However, a method of operating the first and second detection modes (T2', T4', T6' and T8' sections) are different from that of the controller 30' of FIG. 4.

In the first detection mode, the controller 30' operates an image sensor 20 only to obtain an image IB when a light source is OFF, calculates luminous intensity of the image IB when the light source is OFF, and determines whether the calculated luminous intensity is equal to the minimum luminous intensity, thereby detecting the optical mouse is separated from the work surface (T2' an T4' sections).

In the second detection mode, the controller 30' operates the image sensor 20 only to obtain the image IB when the light source is OFF, calculates luminous intensity of the image when the light source is OFF, and determines whether the calculated luminous intensity is equal to the minimum luminous intensity to detect whether the optical mouse is separated from the work surface. When the optical mouse is not separated from the work surface, the controller 30' operates both the light source and the image sensor 20 to obtain an image when the light source is ON, calculates a movement value, and analyzes the calculated movement value, thereby determining whether the optical mouse is moved (T6' and T8' sections).

As described above, the controller 30' having an operation mode of FIG. 11 performs the first and second detection modes similar to FIG. 4 to determine whether the optical mouse is separated from the work surface, using the luminous intensity of the obtained image.

A method of operating the first and second detection modes of FIG. 11 will now be described with reference to FIGS. 12 and 13.

Figure 12:
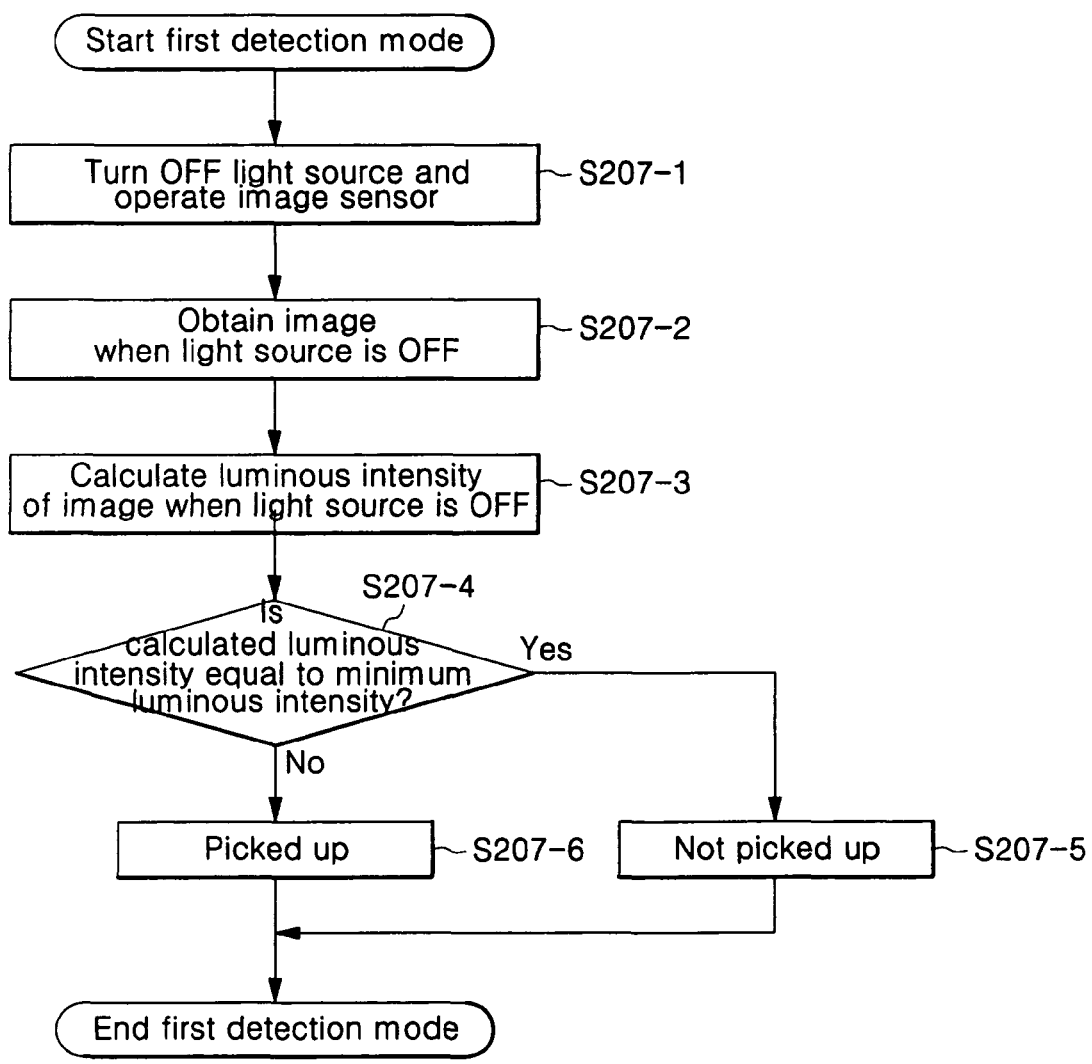
FIG. 12 is a flowchart illustrating the operation of a first detection mode of a controller of FIG. 11.

FIG. 12 is a flowchart illustrating the operation of the first detection mode of the controller 30' of FIG. 11.

When the first detection mode starts, the controller 30' stops the operation of the light source and operates the image sensor 20 only (S207-1) to obtain an image when the light source is OFF (S207-2).

After calculating luminous intensity of the image when the light source is OFF obtained in step S207-2, the controller 30' determines whether the luminous intensity is equal to the minimum luminous intensity obtained during the compensation mode (S207-4).

As a result of the determination of step S207-4, when the luminous intensity of the image when the light source is OFF is equal to the minimum luminous intensity, the controller 30' determines that the optical mouse is positioned on the work surface not to receive light of the peripheral illumination as well as the light source. That is, the controller 30' determines that the optical mouse is in a normal state (S207-5), and then, terminates the first detection mode.

On the other hand, as a result of the determination of step S207-4, when the luminous intensity of the image when the light source is OFF is different from the minimum luminous intensity, the controller 30' determines that the optical mouse is spaced from the work surface to receive light of the peripheral illumination (for example, a fluorescent lamp) to generate an image. That is, the controller 30' determines that the optical mouse is separated from the work surface (S207-6), and then, terminates the first detection mode.

As described above, in the first detection mode of FIG. 12, when the optical mouse is separated from the work surface to receive the light from the peripheral illumination, the controller 30' determines whether the optical mouse is separated from the work surface, on the basis of the fact that the luminous intensity more than the minimum intensity obtained during the compensation mode is received.

FIG. 13 is a flowchart illustrating the operation of the second detection mode of the controller 30' of FIG. 11.

When the second detection mode starts, the controller 30' performs steps S207-1, S207-2, S207-3, S207-4 and S207-6, similarly to the first detection mode S207 of FIG. 12, and further performs steps S212-5 and S212-6 for determining whether the optical mouse is moved, according to the determination of step S207-4.

As a result of the determination of step S207-4, when luminous intensity of the compensated image when the light source is OFF is equal to the minimum luminous intensity, the controller 30' determines that the optical mouse is separated from the work surface (S212-1), and terminates the second detection mode to perform again the sleeping mode.

On the other hand, when luminous intensity of the compensated image when the light source is OFF is different from the minimum luminous intensity, the controller 30' determines that the optical mouse is positioned on the work surface, and then operates both the light source and the image sensor 20 to determine whether the optical mouse is moved (S212-1), thereby obtaining the image when light source is ON (S212-2).

Then, the controller 30' calculates a movement value of the optical mouse using the image when the light source is ON (S212-3), and determines whether the optical mouse is moved, using the calculated movement value of the optical mouse (S212-4).

As a result of the determination of step S212-4, when the optical mouse is moved, the controller 30' determines that a user reuses the optical mouse (S212-5), and terminates the second detection mode to perform again the calculation mode. When the optical mouse is not moved, the controller 30' determines that a user does not use the optical mouse (S212-6), and terminates the second detection mode to continuously perform the sleeping mode.

As described above, in the second detection mode of FIG. 13, when the optical mouse is separated from the work surface to receive light from the peripheral illumination, the controller 30' determines whether the optical mouse is separated from the work surface, on the basis of the fact that the luminous intensity more than the minimum intensity obtained during the compensation mode is received.

Therefore, in the second detection mode of FIG. 13, the controller 30' periodically determines whether the optical mouse is moved and separated from the work surface, similarly to the second detection mode of FIG. 10.

In the above description, while the separation detection and the movement detection are simultaneously performed during the second mode in the inactive state, in actual applications, the separation detection and the movement detection may be separately performed in different cycles, and only one of the separation detection and the movement detection may be performed.

For example, when the separation detection operation is performed as described above to determine the separation of the optical mouse, the controller of the optical mouse turns OFF the light source and stops output of the movement value, and periodically performs the separation detection operation only to re-determine whether the optical mouse is separated from the work surface. In addition, the movement detection operation is repeatedly performed in a different cycle from the separation detection operation to determine only whether the optical mouse is moved.

Further, when the optical mouse is operated in the peripheral illumination state during the calculation mode, while the controller terminates the calculation mode and performs the sleeping mode, if necessary, the controller may maintain the calculation mode and turn OFF the light source, thereby preventing glare caused by the light source or stopping output of the movement value to prevent malfunction of the optical mouse.

As can be seen from the foregoing, an optical navigation device and a method of operating the same in accordance with the present invention periodically further performs first and second detection modes to detect whether an optical mouse is separated from the work surface and detect whether the optical mouse is separated from the work surface even in a calculation mode. When the optical navigation device is separated from the work surface, the optical navigation device is instantly operated in a sleeping mode. Therefore, it is possible to minimize malfunction and unnecessary power consumption of the optical navigation device, which may be generated when the optical navigation device is spaced apart from a work surface.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. An optical navigation device comprising:
   a light source that irradiates light;
   an image sensor that collects incident light to obtain an image and outputs the image; and a controller that performs:
   a compensation mode that turns OFF the light source and receives a plurality of images as a plurality of compensation images when the optical navigation device is not separated and then obtains a minimum luminous intensity from luminous intensities of the plurality of compensation images,
   a calculation mode that turns ON the light source and receives the image to calculate a movement value, and then determines whether the optical navigation device is moved on the basis of the movement value,
   a sleeping mode that turns OFF the light source and stops an operation of the image sensor, and
   a detection mode that turns OFF the light source and receives the image as a detection image, and then compares the luminous intensity of the detection image with the minimum luminous intensity and determine that the optical navigation device is not separated from the work surface when the luminous intensity of the detection image is substantially equal to the minimum luminous intensity of the plurality of compensation images
   wherein the controller performs the calculation mode when the optical navigation device is moved and not separated from the work surface, performs the sleeping mode when not moved or separated from the work surface, and periodically performs the detection mode during the calculation mode and the sleeping mode, and
   wherein the compensation mode is performed at an initial stage of the device operation.

2. The optical navigation device according to claim 1, wherein, in the compensation mode, the controller obtains the minimum luminous intensity on the basis of statistics.

3. The optical navigation device according to claim 2, wherein the statistics include an average value of the luminous intensities of the compensation images.

4. The optical navigation device according to claim 1, wherein the controller divides the detection mode into a first detection mode periodically performed during the calculation mode and a second detection mode periodically performed during the sleeping mode;
   during the first detection mode, obtains the image when the light source is OFF to calculate luminous intensity of the image, and then compares the calculated luminous intensity with the minimum luminous intensity to determine whether the optical navigation device is separated from the work surface; and
   during the second detection mode, obtains the image when the light source is OFF to calculate luminous intensity of the image, compares the calculated luminous intensity with the minimum luminous intensity to determine the optical navigation device is separated from the work surface, and at the same time, obtains the image when the light source is ON to calculate a movement value to determine whether the optical navigation device is moved.

5. The optical navigation device according to claim 4, wherein the controller turns OFF the light source when the optical navigation device is separated from the work surface during the second detection mode, and then periodically determines only whether the optical navigation device is separated from the work surface.

6. The optical navigation device according to claim 4, wherein the controller stops output of the movement value when the optical navigation device is separated from the work surface during the second detection mode, and then periodically determines only whether the optical navigation device is separated from the work surface.

7. A method of operating an optical navigation device comprising:
   a compensation step of obtaining a plurality of images as a plurality of compensation images when a light source is OFF and obtaining a minimum luminous intensity from luminous intensities of the plurality of compensation images; a calculation step of obtaining an image when the light source is ON to calculate a movement value, and determining whether the optical navigation device is moved on the basis of the calculated movement value;
   a sleeping step of turning OFF the light source and stopping an image obtaining;
   a first detection step of periodically enabling the optical navigation device during the calculation step, obtaining an image when the light source is OFF as a first detection image, comparing the luminous intensity of the first detection image with the minimum luminous intensity to determine that the optical navigation device is not separated from the work surface when the luminous intensity of the first detection image is substantially equal to the minimum luminous intensity of the plurality of compensation images, and starting the sleeping step when the optical navigation
   device is separated from the work surface; and
   a second detection step of periodically enabling the optical navigation device during the sleeping step, obtaining an image when the light source is OFF as a second detection image, comparing the luminous intensity of the second detection image with the minimum luminous intensity to determine that the optical navigation device is not separated from the work surface when the luminous intensity of the second detection image is substantially equal to the minimum luminous intensity of the plurality of compensation images obtaining an image when the light source is on to determine whether the optical navigation device is moved, so that the calculation step starts again when the optical navigation device is moved and not separated from the work surface,
   wherein the compensation mode is performed at an initial stage of the device operation.

8. The method according to claim 7, wherein the minimum luminous intensity includes an average value of the luminous intensities of the compensation images.

9. The method according to claim 7, wherein the calculation step comprises the steps of:
   continuously obtaining the image when the light source is ON, and calculating and outputting a movement value; and
   determining whether the optical navigation device is moved on the basis of the calculated movement value.

* * * * *